(12) United States Patent
Van De Graaf et al.

(10) Patent No.: US 7,517,389 B2
(45) Date of Patent: Apr. 14, 2009

(54) REMOVAL OF SULPHUR COMPOUNDS FROM HYDROCARBON STREAMS USING ADSORBENTS AND REGENERATION OF THE LOADED ADSORBENTS

(75) Inventors: Jolinde Machteld Van De Graaf, Amsterdam (NL); Thijme Last, Amsterdam (NL)

(73) Assignee: Shell Oil Company, Houston, TX (US)

( * ) Notice: Subject to any disclaimer, the term of this patent is extended or adjusted under 35 U.S.C. 154(b) by 377 days.

(21) Appl. No.: 10/533,172

(22) PCT Filed: Oct. 29, 2003

(86) PCT No.: PCT/EP03/50765

§ 371 (c)(1), (2), (4) Date: Apr. 29, 2005

(87) PCT Pub. No.: WO2004/039926

PCT Pub. Date: May 13, 2004

(65) Prior Publication Data

US 2006/0107832 A1    May 25, 2006

(30) Foreign Application Priority Data

Oct. 29, 2002    (EP) .................................. 02257483

(51) Int. Cl.
  *C10L 3/10*    (2006.01)
  *C10G 25/12*   (2006.01)
  *B01D 53/04*   (2006.01)
  *B01D 53/14*   (2006.01)

(52) U.S. Cl. ............................. 95/135; 95/136; 95/148; 95/235; 423/220; 585/826

(58) Field of Classification Search .................. 95/117, 95/135, 136, 148, 235, 902; 423/220, 228, 423/229, 242.1, 242.7, 242.2; 96/132; 208/208 R; 585/820, 826; 210/660, 667
See application file for complete search history.

(56) References Cited

U.S. PATENT DOCUMENTS

| | | | | |
|---|---|---|---|---|
| 3,051,646 A | | 8/1962 | Brooke | 208/250 |
| 3,188,293 A | | 6/1965 | Bacon et al. | 252/411 |
| 3,470,677 A | * | 10/1969 | Eck et al. | 95/136 |
| 3,566,611 A | | 3/1971 | Sterrett | 62/18 |
| 3,594,983 A | * | 7/1971 | Yearout | 95/97 |
| 3,620,969 A | | 11/1971 | Hain et al. | 208/245 |
| 3,725,299 A | | 4/1973 | Turnock et al. | 252/411 |
| 4,329,160 A | * | 5/1982 | Sherman et al. | 95/136 |
| 4,358,297 A | * | 11/1982 | Eberly, Jr. | 95/136 |
| 4,784,672 A | * | 11/1988 | Sircar | 95/97 |
| 4,935,399 A | * | 6/1990 | Blackburn et al. | 502/34 |
| 4,957,715 A | * | 9/1990 | Grover et al. | 423/228 |
| 4,971,682 A | * | 11/1990 | Clark | 208/305 |
| 5,041,693 A | | 8/1991 | Zarchy | 585/826 |
| 6,074,459 A | * | 6/2000 | Gingrich et al. | 95/118 |
| 6,843,907 B1 | * | 1/2005 | Kanazirev et al. | 208/213 |
| 2001/0009125 A1 | * | 7/2001 | Monereau et al. | 95/117 |

FOREIGN PATENT DOCUMENTS

| | | |
|---|---|---|
| CN | 1227255 | 9/1999 |
| EP | 0335034 | 10/1989 |
| GB | 2275625 | 9/1994 |
| WO | 00/56441 | 9/2000 |

OTHER PUBLICATIONS

International Search Report dated Feb. 9, 2004.

* cited by examiner

*Primary Examiner*—Frank M Lawrence
(74) *Attorney, Agent, or Firm*—Charles W. Stewart

(57) ABSTRACT

The invention concerns a process for the removal of sulphur compounds from a hydrocarbon stream, especially a gaseous hydrocarbon gas stream, comprising said sulphur compounds, which process comprises contacting said gas stream with an adsorbent comprising a zeolite having a pore diameter of at least 5 Å to adsorb the sulphur compounds thereon, the adsorption process followed by a regeneration process of used, loaded adsorbent by contacting the said loaded adsorbent with a regeneration gas stream having a relative water humidity less than 100%, especially less than 80%. Suitably the regeneration is followed by a dry regeneration treatment. The invention further relates to a process for the regeneration of adsorbent comprising a zeolite having a pore diameter of at least 5 Å loaded with sulphur compounds by contacting the adsorbent with a regeneration gas stream having a relative water humidity less than 100%, especially less than 80%. Suitably the regeneration is followed by a dry regeneration treatment.

17 Claims, No Drawings

REMOVAL OF SULPHUR COMPOUNDS FROM HYDROCARBON STREAMS USING ADSORBENTS AND REGENERATION OF THE LOADED ADSORBENTS

PRIORITY CLAIM

The present application claims priority of International Application No. PCT/EP2003/050765 filed 29 Oct. 2003.

FIELD OF THE INVENTION

The invention relates to a process for the removal of sulphur compounds from hydrocarbon streams using adsorbents and regeneration of the loaded adsorbents.

The present invention relates to a process for the removal of sulphur compounds from a hydrocarbon stream, especially a gaseous hydrocarbon stream, comprising said sulphur compounds, which process comprises contacting said gas stream with an adsorbent comprising a zeolite having a pore diameter of at least 5 Å to adsorb the sulphur compounds thereon, the adsorption process followed by a regeneration process of used, loaded adsorbent by contacting the said loaded adsorbent with a regeneration gas stream comprising a certain amount of water. The invention further concerns a process for the regeneration of adsorbent comprising a zeolite having a pore diameter of at least 5 Å loaded with sulphur compounds by contacting the adsorbent with a regeneration gas stream having a relative water humidity less than 100%, especially less than 80%. The above described wet regeneration processes are suitably followed by dry regeneration processes.

BACKGROUND OF THE INVENTION

The removal of sulphur-containing compounds from hydrocarbon streams comprising such compounds has always been of considerable importance in the past and is even more so today in view of continuously tightening process requirements and environmental regulations. This holds not only for natural gas streams to be used for e.g. the preparation of synthesis gas or for residential use or to be transported as liquefied natural gas, but also for natural gas liquid streams, natural gas condensate streams as well as for crude oil derived refinery streams containing sulphur compounds.

Sulphur contaminants in hydrocarbon streams include hydrogen sulphide, carbonyl sulphide, mercaptans, sulphides, disulfides, thiophenes and aromatic mercaptans, which due to their odorous nature can be detected at parts per million concentration levels. Thus, it is desirable for users of such natural gas and refinery streams to have concentrations of total sulphur compounds lowered to e.g. less than 20 or 30 ppmv or less than 50-75 mg S/Nm$^3$, the amount of non-hydrogen sulphide compounds lowered to e.g. less than 5, or even less than 2 ppmv or less than 12 mg S/Nm$^3$ or even less than 5 mg S/Nm$^3$.

Numerous natural gas wells produce what is called "sour gas", i.e. natural gas containing hydrogen sulphide, mercaptans, sulphides and disulfides in concentrations that makes the natural gas unsuitable for direct use. Considerable effort has been spent to find effective and cost-efficient means to remove these undesired compounds. In addition, the natural gas may also contain varying amounts of carbon dioxide, which depending on the use of the natural gas often has to be removed at least partly. Streams used and obtained in refineries, especially hydrogen containing streams obtained in hydrodesulphurisation processes and obtained in hydrocarbon reforming processes as well as obtained by partial oxidation of sulphur containing feed streams, often contain the sulphur compounds as described before.

A number of processes are known for the removal of sulphur compounds and optionally carbon dioxide from hydrocarbon streams. These processes are based on physical and/or chemical absorption, chemical reaction and/or solid bed adsorption. Physical and/or chemical absorption processes, often using aqueous alkaline solutions, usually are able to remove hydrogen sulphide and, when carbon dioxide is present, a large amount of the carbon dioxide, in some cases even complete removal of the carbon dioxide is obtained. However, the complete removal of sulphur compounds as mercaptans, sulphides and disulphides is much more difficult. Chemically reacting processes in general are able to remove carbon dioxide and/or hydrogen sulphide without large difficulties; however, they suffer from the fact that they do not effectively remove mercaptans, sulphides and disulfides and often produce large amounts of useless waste (such as non-regenerable adsorbents). Regenerable solid bed adsorption processes are very suitable for the removal of the larger sulphur compounds such as methyl mercaptan, ethyl mercaptan, normal and isopropyl mercaptan and butyl mercaptan. However, the regeneration of the adsorption beds is often a considerable problem. A gradual decrease in adsorption capacity is caused by ageing of the adsorbents. Several types of ageing exists: thermal cycling, hydrothermal ageing, and contamination, often caused by co-adsorption of species and coke formation on the surface of the adsorbent.

SUMMARY OF THE INVENTION

It has now been found that when the sulphur loaded adsorbent is regenerated in the presence of a relatively low amount of water, the degradation/ageing of the said adsorbent is significantly reduced. In view of the relatively low amount of water present, hydrothermal ageing appears to be very low, while the formation of coke is considerably decreased. Thus, the economic life of the adsorbent inventory is extended, or, alternatively, a smaller adsorbent inventory can be used for the process when compared to a normal accepted industry dry gas regeneration process.

The present invention therefore relates to a process for removing sulphur compounds from hydrocarbon streams using adsorbents and the regeneration of the loaded adsorbent.

Very suitably the hydrocarbon stream to be treated is a gaseous hydrocarbon stream, especially a natural gas stream, an associated gas stream, or a refinery gas stream. Natural gas is a general term that is applied to mixtures of inert and light hydrocarbon components that are derived from natural gas wells. The main component of natural gas is methane. Further, often ethane, propane and butane are present. In some cases (small) amounts of higher hydrocarbons may be present, often indicated as natural gas liquids or condensates. Inert compounds may be present, especially nitrogen, carbon dioxide and, occasionally, helium. When produced together with oil, the natural gas is usually indicated as associated gas. Hydrogen sulphide, mercaptans, sulphides, disulfides, thiophenes and aromatic mercaptans may be present in natural gas in varying amounts. Refinery streams concern crude oil derived gaseous hydrocarbon streams containing smaller or larger amounts of sulphur compounds. Also recycle streams and bleed streams of hydrotreatment processes, especially hydrodesulphurisation processes, may be treated by the process according to the present invention.

The process of the invention may also be used for the removal of the sulphur compounds from liquid hydrocarbon streams as natural gas liquids streams, natural gas condensate streams and crude oil derived refinery streams, especially natural gas liquids streams and natural gas condensate streams. Natural gas liquids are well known in the art (see for instance The Petroleum Handbook, Elsevier, Amsterdam/London/New York, 1983, p. 555) and contain hydrocarbons heavier than methane, usually contain $C_3$-$C_{12}$ compounds, often more than 50 wt % being $C_4$-$C_{10}$ compounds. Natural gas liquids (NGL) are suitably produced directly at the well head by separating the production stream from the subsurface formation at high pressure (usually between 40 and 90 bara) into a gaseous stream, an aqueous stream and a liquid hydrocarbon stream (the NGL stream). Cooling the gaseous stream usually results in a further amount of liquid products (condensates), mostly consisting of $C_4$-$C_{12}$ compounds, usually at least 50 wt % $C_5$+ hydrocarbons. Suitable refinery streams are distillation fractions boiling in the naphtha, kero and diesel ranges (e.g. boiling ranges between 30 and 380° C.), as well as heavy gas oils and recycle oils (e.g. boiling between 250 and 450° C.).

The sulphur compounds which may be removed by the process of the present invention are in principle all compounds which are adsorbed by adsorbents comprising zeolites having a pore diameter of at least 5 Å.

Usually the sulphur compounds are hydrogen sulphide, carbonyl sulphide, mercaptans, especially $C_1$-$C_6$ mercaptans, organic sulphides, especially di-$C_1$-$C_4$-alkyl sulphides, organic disulphides, especially di-$C_1$-$C_4$-alkyl disulphides, thiophene compounds, aromatic mercaptans, especially phenyl mercaptan, or mixtures thereof, preferably mercaptans, more especially $C_1$-$C_4$ mercaptans. The invention especially relates to the removal of methyl mercaptan, ethyl mercaptan, normal- and iso-propyl mercaptan and the four butyl mercaptan isomers. In the process of the present invention hydrothermal ageing and the formation of carbon on the zeolite adsorbent is particularly low in the case of regeneration of adsorbent loaded with these lower alkyl mercaptans.

The starting hydrocarbon stream may contain any amount of sulphur compounds, but in general, the total amount of sulphur compounds will be up to 3 vol % based on total gas stream, is preferably up till 1.5 vol %, more preferably up till 0.1 vol %, still more preferably between 1 and 700 ppmv, most preferably between 2 and 500 ppmv. Higher amounts of sulphur, especially when it concerns mainly hydrogen sulphide, can be removed by the process of the present invention, but are more suitably removed by washing processes in which chemical and/or physical solvents are used.

The starting hydrocarbon stream can be a dry hydrocarbon stream, but, especially when it is a gaseous hydrocarbon stream, may contain a certain amount of water. Especially in the case of natural or associated gas the stream will be saturated with water.

In the case that water is present in the hydrocarbon stream, a more efficient process is obtained when the water is removed before the removal of the sulphur compounds, preferably by adsorbing the water on a zeolite having a pore diameter of less than 5 Å, preferably a pore diameter of 3 or 4 Å. In such zeolites hardly any sulphur is adsorbed, only water is adsorbed. In general, the capacity of such zeolites is higher than larger pore zeolites. The amount of water to be removed may be small or large, but preferably at least 60 wt % of the water is removed, preferably 90 wt %. Very suitably water is removed to a level of less than 1% v in the treated gas, preferably less than 100 ppmv, more preferably less than 5 ppmv.

Especially in the case of natural and associated gas, a considerable amount of the total amount of sulphur compounds is formed by hydrogen sulphide. Amounts of up to 10 or even 20 vol % or even more of hydrogen sulphide may be present. Further smaller or larger amounts of carbon dioxide may be present. Sometimes amounts of up to 10 or even 20 vol % or even more of carbon dioxide may be present. Suitably the gas stream comprises hydrogen sulphide and optionally carbon dioxide up till 2 vol % hydrogen sulphide, more preferably up till 0.5 vol % hydrogen sulphide. In the case that larger amounts of hydrogen sulphide are present in the gas stream, it appears to be very efficient to remove the hydrogen sulphide (and at least part of the carbon dioxide by means of a washing process in which the gas stream is washed with a chemical and/or physical solvent, preferably an aqueous alkaline solution, more preferably an aqueous amine solution. The use of organic solvents or aqueous solutions of organic solvents for removing of so-called acidic gasses as hydrogen sulphide and optionally carbon dioxide and/or COS from a gas stream containing these compounds has been described long ago. See for instance A. L. Kohl and F. C. Riesenfeld, 1974, Gas Purification, 2nd edition, Gulf Publishing Co. Houston and R. N. Maddox, 1974, Gas and Liquid Sweetening, Campbell Petroleum Series. Preferably a regenerable absorbent solvent is used in a continuous process.

On an industrial scale there are chiefly two categories of absorbent solvents, depending on the mechanism to absorb the acidic components: chemical solvents and physical solvents. Each solvent has its own advantages and disadvantages as to features as loading capacity, kinetics, regenerability, selectivity, stability, corrosivity, heat/cooling requirements etc.

Chemical solvents which have proved to be industrially useful are primary, secondary and/or tertiary amines derived alkanolamines. The most frequently used amines are derived from ethanolamine, especially monoethanol amine (MEA), diethanolamine (DEA), triethanolamine (TEA), diisopropanolamine (DIPA) and methyldiethanolamine (MDEA).

Physical solvents which have proved to be industrially suitable are cyclo-tetramethylenesulfone and its derivatives, aliphatic acid amides, N-methylpyrrolidone, N-alkylated pyrrolidones and the corresponding piperidones, methanol, ethanol and mixtures of dialkylethers of polyethylene glycols.

A well-known commercial process uses an aqueous mixture of a chemical solvent, especially DIPA and/or MDEA, and a physical solvent, preferably an alcohol, especially methanol or ethanol, cyclo-tetramethylene sulfone or its derivatives, or N-methylpyrrolidone, preferably cyclo-tetramethylene sulfone. Such systems show good absorption capacity and good selectivity against moderate investment costs and operational costs. They perform very well at high pressures, especially between 20 and 90 bara. Preferably in the hydrogen sulphide removal step at least 90 wt % of the hydrogen sulphide based on total weight of hydrogen sulphide present in the gas stream is removed, preferably 95 wt %, especially hydrogen sulphide is removed till a level of less than 10 ppmv, more especially to a level of less than 5 ppmv.

The process according to the present invention may be carried out in a continuous mode, preferably using two or more reactors comprising zeolite, at least one reactor in an adsorbing mode and at least one reactor is a desorbing mode. Depending on the actual situation there may be combinations of two, three, four or even more reactors, one in absorbing mode, the others in different stages of desorbing mode.

The temperature of the zeolite adsorption process is may vary between wide ranges, and is suitably between 0 and 80° C., preferably between 10 and 60° C., the pressure is suitably between 10 and 150 bara. The superficial gas velocity is suitably between 0.03 and 0.6 m/s, preferably between 0.05 and 0.40 m/s.

Beside the above described process for the removal of sulphur compounds from a hydrocarbon stream followed by regeneration of the loaded adsorbent, the invention also relates to a process for the regeneration of adsorbent as such, the process comprising the regeneration of a zeolite having a pore diameter of at least 5 Å loaded with sulphur compounds by contacting the adsorbent with a regeneration gas stream having a relative water humidity less than 100%, especially less than 80%.

The above described regeneration processes are suitably carried out for a period up till 24 hours, preferably up till 12 hours.

After the above described regeneration process in which a regeneration gas is used containing a certain amount of water, the regeneration of the adsorbent is finalised by regeneration with a dry gas stream, preferably a dry gas stream comprising less than 5 ppmv water, more preferably less than 1 ppmv water, the dry regeneration being carried out for a period suitably up till 8 hours, preferably for a period up till 4 hours. In this way the adsorption capacity is fully restored.

The regeneration process according to the present invention preferably uses an adsorbent comprising zeolite dispersed in a binder, preferably a molsieve, the zeolite preferably of zeolite type A or zeolite type X. Such materials, especially the molsieves, are commercially available.

A further improvement of the process according to the present invention is the use of adsorbent is in the form of at least two beds, one bed comprising zeolite having a pore diameter of 5 Å, preferably 3 or 4 Å, the second and, if present, further beds comprising a zeolite having a pore diameter of more than 5 Å, preferably at least 6 Å, more preferably molsieve 13x. The zeolite having the pore diameter of 5 Å removes hydrogen sulphide, methyl mercaptan and (if present) any water from the hydrocarbon stream, while the second bed removes all higher mercaptans and larger sulphur compounds. It will be appreciated that the above-indicated beds can be applied in one single vessel, or may be spread over two (or even more) vessels. Please note that the before mentioned bed containing the 3 or 4 Å zeolite to remove any water upstream of the sulphur compound removal, may be incorporated into the above mentioned one or two vessels, or may be applied in an additional vessel. The advantage of using more than one vessel is that each vessel can be used at its most optimal conditions, for adsorption as well as for regeneration.

The regeneration may be carried out at standard temperatures, pressures and gas velocities, and is suitably carried out at a pressure between 1 and 150 bara, preferably 30-1.20 bara, more preferably 50-90 bara, a temperature between 200 and 400° C., preferably between 230 and 350° C., and a superficial gas velocity of less than 0.20 m/s, preferably between 0.02 and 015 m/s. The regeneration gas stream to be used may be in principle each inert gas or inert gas mixture. Suitably nitrogen, hydrogen or a hydrocarbon gas stream is used, preferably a treated gas stream which obtained by a sulphur removal process as described above. The regeneration gas stream having a certain relative water humidity to be used in any of the above-described process may be obtained by any suitable method. For instance, a dry gas may be mixed with a saturated gas, or a dry gas stream is saturated followed by an increase of the temperature. Preferably the regeneration gas stream is a gas stream obtained by saturating the stream at a temperature below the regeneration temperature, preferably at least 50° C. below the regeneration temperature, more preferably 75° C. below the regeneration temperature, followed by heating the stream till the regeneration temperature.

The relative humidity of the regeneration gas stream is suitably at least 0.1%, more suitably at least 4%. Preferably the regeneration gas stream is a gas stream having a relative humidity between 5 and 60%, preferably between 10 and 30%. The combination of a relative humidity of between 5 and 60%, preferably between 10 and 30% is especially preferred in combination with a temperature between 200 and 400° C., preferably between 230 and 350° C. and a pressure between 30 and 120 bara, preferably between 50 and 90 bara.

In those cases in which the temperature of the regeneration gas is above the condensation point of steam, the relative humidity is defined as the volume percentage of the water in the gas stream.

The invention will now be illustrated with the following non-limiting examples.

A comparison of dry and wet regeneration was made using cycles of adsorption and regeneration in a thermo-gravimetric analyser. A 13x type mol sieve was exposed to i-C3H7SH at 25° C. and then heated to 300° C. Each cycle of adsorption and regeneration was repeated 100 times on the initially fresh mol-sieve. Different water concentrations, expressed as partial pressure of water, for the wet regeneration scheme have been tested in the "wet" regeneration process. From the results in table 1 it can be seen that the sample exposed to the wet regeneration conditions did not deactivate as quickly as the sample exposed to dry regeneration conditions. Furthermore, it can be seen that 15Pa of water in the regeneration stream is as effective as 2300Pa.

The capacity of a 4A sieve to adsorb water does not saturate until approximately 150Pa water. Thus, at 15Pa of water, the uptake capacity on the 13x sieve is still likely to be strongly dependent on the partial pressure of water. The results indicate that the molsieve coverage resulting from only 15Pa water in the regeneration stream results in sufficient water coverage to suppress the mercaptan decomposition. Table 1. Deactivation of 13x mol sieve after exposure to different water concentrations during wet regeneration.

| Number of cycles | Water Concentration (partial pressure, in Pa) | Starting capacity (wt % i-C3H7SH) | End capacity (wt % i-C3H7SH) |
| --- | --- | --- | --- |
| 50 | 0 (dry regeneration, comparative example) | 19.2 | 12.1 |
| 50 | 2300 | 18.0 | 17.2 |
| 50 | 15 | 17.4 | 16.7 |

The invention claimed is:

1. A process for removing water and sulfur compounds from a hydrocarbon stream containing water and sulfur compounds selected from the group consisting of hydrogen sulfide, carbonyl sulfides, mercaptans, especially $C_1$-$C_6$ mercaptans, organic disulfides, especially di-$C_1$-$C_4$-alkyl sulphides, organic disulfides, especially di-$C_1$-$C_4$-alkyl disulfides, thiophene compounds, aromatic mercaptans, especially phenyl mercaptan, and mixtures thereof, wherein the total amount of said sulfur compounds contained in the hydrocarbon stream is up to 3 vol %, based on total hydrocarbon stream, by adsorbing at least 60 wt % of the water contained in said hydrocarbon stream therefrom onto a first zeolite having a pore diameter of less than 5 Å; and thereafter, contacting said hydrocarbon stream with an adsorbent comprising a second zeolite having a pore diameter of at least 5 Å to adsorb the sulfur compounds thereon to thereby provide a loaded adsorbent, followed by a regeneration of said loaded adsorbent in the presence of water by contacting said loaded adsorbent with a regeneration gas stream comprising an inert gas or an inert gas mixture having a relative humidity of between 5% and 60%, said regeneration being conducted at a temperature of between 200 and 400° C. and a pressure between 30 and 120 bara, whereby an absorbent having significantly reduced degradation/ageing is obtained.

2. A process according to claim 1, in which the hydrocarbon stream is a gaseous stream and also comprises hydrogen sulfide and optionally carbon dioxide and up to 2 vol % hydrogen sulfide, with the hydrogen sulfide and part of the carbon dioxide being removed by means of washing the hydrocarbon stream with a chemical solvent.

3. A process according to claim 2, in which the temperature of the zeolite adsorption process is between 10 and 60° C., the pressure is between 10 and 150 bara, and the superficial gas velocity is between 0.03 and 0.6 m/s.

4. A process for the regeneration of an adsorbent, wherein said process comprises:
providing one or more vessels having a first adsorbent bed comprising a first zeolite having a pore diameter of 5 Å or less and a second adsorbent bed comprising a second zeolite having a pore diameter of more than 5 Å;
using said one or more vessels in the removal of sulfur compounds from a hydrocarbon stream to provide said second zeolite that is loaded with sulfur compounds; and
regenerating said second zeolite that is loaded with sulfur compounds by contacting the adsorbent with a regeneration gas stream having a relative water humidity of between 5% and 60% at a temperature of between 200 and 400° C. and a pressure between 30 and 120 bara, whereby a second zeolite having a significantly reduced degradation/ageing is obtained.

5. A process according to claim 4, in which the adsorbent in said second adsorbent bed comprises zeolite dispersed in a binder and the relative water humidity of said regeneration gas stream is between 10% and 30%.

6. A process according to claim 4, in which the regeneration is carried out at a pressure between 50 and 90 bara, a temperature between 230 and 350° C., and a superficial gas velocity of less than 0.20 m/s.

7. A process according to claim 6, in which the regeneration gas stream is a gas stream obtained by saturating the stream at a temperature below the regeneration temperature.

8. A process according claim 7, in which the regeneration gas stream has a relative humidity between 10 and 30%.

9. A process for the removal of sulfur compounds from a hydrocarbon stream, wherein said hydrocarbon stream is a gaseous stream and contains a sulfur compound selected from the group consisting of hydrogen sulfide, carbonyl sulfide, mercaptans, organic sulfides, organic disulfides, thiophene compounds, aromatic mercaptans and mixtures thereof, said process comprises:
treating said hydrocarbon stream to remove water therefrom followed by contacting said hydrocarbon stream with an adsorbent comprising a zeolite having a pore diameter of at least 5 Å to absorb said sulfur compound thereon to thereby provide a sulfur loaded adsorbent; and
contacting said sulfur loaded adsorbent with a regeneration gas stream having a relative humidity between 10 and 30%, wherein the regeneration gas comprises an inert gas, whereby a regenerated adsorbent is obtained having significantly reduced degradation/ageing is obtained.

10. A process according to claim 9, wherein said mercaptans include $C_1$-$C_6$ mercaptans, said organic sulfides include di-$C_1$-$C_4$-alkyl sulfides, organic disulfides include di-$C_1$-$C_4$ alkyl disulfides, said aromatic mercaptans include phenyl mercaptan, and the total amount of said sulfur compounds contained in said hydrocarbon stream is up to 3 vol % based on total gas stream.

11. A process according to claim 10, in which said hydrocarbon stream prior to contacting with said adsorbent, comprises hydrogen sulfide in the range up to 2 vol % hydrogen sulfide, and a part thereof is removed by means of washing with a chemical solvent.

12. A process according to claim 11, in which the temperature of the step of contacting said hydrocarbon stream with said adsorbent is between 10 and 60° C., the pressure is between 10 and 150 bara, and the superficial gas velocity is between 0.03 and 0.6 m/s.

13. A process for the regeneration of an adsorbent, which is loaded with a sulfur compound, by contacting the adsorbent with a regeneration gas stream having a relative water humidity of between 5 and 60% at a temperature of between 200 and 400° C. and a pressure between 30 and 120 bara, wherein said adsorbent is contained in at least two beds, with one bed comprising a first zeolite having a pore diameter of up to 5 Å, and with a second bed comprising a second zeolite having a pore diameter of more than 5 Å, whereby said regenerated absorbent has significantly reduced degradation/ageing.

14. A process according to claim 13, wherein said adsorbent of said second bed further comprises said second zeolite dispersed in a binder.

15. A process according to claim 14, in which the contacting step is carried out at a pressure between 50 and 90 bara, a temperature between 230 and 350° C. and a superficial gas velocity of less than 0.20 m/s.

16. A process according to claim 15, in which said regeneration gas stream is a gas stream obtained by saturating the stream at a temperature below the regeneration temperature.

17. A process according to claim 16, in which said regeneration gas stream has a relative humidity between 10 and 30%.

* * * * *